(12) United States Patent
Ogihara et al.

(10) Patent No.: US 10,930,962 B2
(45) Date of Patent: Feb. 23, 2021

(54) NITROGEN BATTERY, FUEL SYNTHESIZING APPARATUS, AND FUEL SYNTHESIZING METHOD

(71) Applicant: KABUSHIKI KAISHA TOYOTA CHUO KENKYUSHO, Nagakute (JP)

(72) Inventors: Nobuhiro Ogihara, Nagakute (JP); Yoko Hase, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 247 days.

(21) Appl. No.: 16/259,359

(22) Filed: Jan. 28, 2019

(65) Prior Publication Data
US 2019/0260014 A1  Aug. 22, 2019

(30) Foreign Application Priority Data
Feb. 22, 2018  (JP) .............................. JP2018-029276

(51) Int. Cl.
*H01M 8/22*     (2006.01)
*H01M 4/36*     (2006.01)
(Continued)

(52) U.S. Cl.
CPC .......... *H01M 8/222* (2013.01); *H01G 9/2004* (2013.01); *H01G 9/2009* (2013.01); *H01G 9/2013* (2013.01); *H01G 9/2018* (2013.01); *H01G 11/06* (2013.01); *H01G 11/30* (2013.01); *H01G 11/32* (2013.01); *H01G 11/50* (2013.01); *H01G 11/56* (2013.01); *H01G 11/58* (2013.01); *H01G 11/62* (2013.01); *H01M 4/13* (2013.01); *H01M 4/364* (2013.01); *H01M 4/405* (2013.01); *H01M 4/621* (2013.01); *H01M 8/0693* (2013.01); *H01M 8/18* (2013.01); *H01M 10/0562* (2013.01); *H01M 12/06* (2013.01);
(Continued)

(58) Field of Classification Search
CPC .... H01M 4/364; H01M 8/0693; H01M 8/222; H01M 10/0562; H01G 9/2004; H01G 9/2009; H01G 9/2013; H01G 9/2018; H01G 11/06; H01G 11/30; H01G 11/50; H01G 11/56; H01G 11/62; H01G 2009/0014; H01G 2009/0025
USPC ....................................... 429/231.8
See application file for complete search history.

(56) References Cited

U.S. PATENT DOCUMENTS

2011/0244337 A1   10/2011   Ohta et al.
2016/0194767 A1*   7/2016   Mulder ................. C25B 11/035
                                                          205/338
(Continued)

FOREIGN PATENT DOCUMENTS

JP    2010-272344 A    12/2010

OTHER PUBLICATIONS

Jin-Ling MA et al. "Reversible Nitrogen Fixation Based on a Rechargeable Lithium-Nitrogen Battery for Energy Storage". Chem 2, Apr. 13, 2017, pp. 525-532.
(Continued)

*Primary Examiner* — James M Erwin
(74) *Attorney, Agent, or Firm* — Oliff PLC

(57) ABSTRACT

The nitrogen battery of the present disclosure includes a positive electrode that uses nitrogen as a positive electrode active material, a negative electrode, and an ion conducting medium that contains a silane compound and conducts alkali metal ions.

11 Claims, 7 Drawing Sheets

(51) Int. Cl.
| | |
|---|---|
| *H01M 4/13* | (2010.01) |
| *H01M 10/0562* | (2010.01) |
| *H01M 4/62* | (2006.01) |
| *H01M 4/40* | (2006.01) |
| *H01G 9/20* | (2006.01) |
| *H01G 11/62* | (2013.01) |
| *H01G 11/58* | (2013.01) |
| *H01G 11/56* | (2013.01) |
| *H01G 11/32* | (2013.01) |
| *H01G 11/30* | (2013.01) |
| *H01G 11/50* | (2013.01) |
| *H01G 11/06* | (2013.01) |
| *H01M 12/06* | (2006.01) |
| *H01M 12/08* | (2006.01) |
| *H01M 8/06* | (2016.01) |
| *H01M 8/18* | (2006.01) |
| *H01M 4/02* | (2006.01) |
| *H01G 9/00* | (2006.01) |

(52) U.S. Cl.
CPC .... *H01M 12/08* (2013.01); *H01G 2009/0014* (2013.01); *H01G 2009/0025* (2013.01); *H01M 2004/027* (2013.01); *H01M 2004/028* (2013.01)

(56) References Cited

U.S. PATENT DOCUMENTS

2017/0250433 A1* 8/2017 Zhang ............... H01M 8/222
2018/0334753 A1* 11/2018 Rondinone ......... C25B 11/0405

OTHER PUBLICATIONS

Linhua Xie et al. "Mixed-Valence Iron (II, III) Trimesates With Open Frameworks Modulated by Solvents". Inorganic Chemistry, 2007, vol. 46, No. 19, pp. 7782-7788.
Marie V. Parkes et al. "Effect of Metal in M3(btc)2 and M2(dobdc) MOFs for O2/N2 Separations: A Combined Density Functional Theory and Experimental Study". The Journal of Physical Chemistry C, 2015, vol. 119, pp. 6556-6567.
Eric D. Bloch et al. "Selective Binding of O2 Over N2 in a Redox-Active Metal-Organic Framework With Open Iron (II) Coordination Sites". Journal of the American Chemical Society, 2011, vol. 133, pp. 14814-14822.
Masahiro Yuki et al. "Iron-Catalysed Transformation of Molecular Dinitrogen Into Silylamine Under Ambient Conditions". Nature Communications, 2012, vol. 3, No. 1254, pp. 1-6.
Hiromasa Tanaka et al. "Molybdenum-Catalyzed Transformation of Molecular Dinitrogen Into Silylamine: Experimental and DFT Study on the Remarkable Role of Ferrocenyldiphosphine Ligands". Journal of the American Chemical Society, 2011, vol. 133, pp. 3498-3506.

* cited by examiner

NITROGEN BATTERY, FUEL SYNTHESIZING APPARATUS, AND FUEL SYNTHESIZING METHOD

BACKGROUND OF THE INVENTION

1. Field of the Invention

The present description discloses a nitrogen battery, a fuel synthesizing apparatus, and a fuel synthesizing method.

2. Description of the Related Art

Previous studies have been conducted on air batteries that use oxygen as a positive electrode active material and sulfur batteries that use sulfur as a positive electrode active material. The theoretical capacity densities of these active materials that are computed from reduction reactions corresponding to discharging of the batteries are 3,350 mAh/g for oxygen and 1,671 mAh/g for sulfur. The theoretical capacity density of nitrogen is very high, i.e., 5,740 mAh/g, and a battery with high energy density is expected. However, there are few studies on the use of nitrogen as a positive electrode active material. This is because, since nitrogen is stable, it is difficult to initiate the reduction reaction of nitrogen. The electron affinity of a molecule is defined as the amount of energy released or absorbed when an electron is added to the molecule, and the electron affinities of the above elements are compared. The electron affinity of oxygen is 141 kJ/mol, and the electron affinity of sulfur is 200 kJ/mol. However, the electron affinity of nitrogen is −4 kJ/mol. Nitrogen having a negative electron affinity absorbs energy when an electron is added and therefore tends not to form an anion. One previously proposed nitrogen battery includes: metallic lithium serving as the negative electrode; and a nonaqueous electrolytic solution disposed between the positive electrode and the negative electrode, wherein nitrogen undergoes a reduction reaction at the positive electrode (see, for example, NPL 1). It is stated that this nitrogen battery can be discharged with nitrogen used as a positive electrode active material.

NPL1: Chem 2, 525-532, Apr. 13, 2017.

SUMMARY OF THE INVENTION

A problem with the nitrogen battery in NPL 1 is that, since its charge voltage is very high and its discharge voltage is low, i.e., 1 V, the nitrogen battery lacks superiority. Moreover, it is difficult to discharge the nitrogen battery, and there is a need to develop a novel nitrogen battery.

The present disclosure has been made in view of the foregoing problem, and it is a primary object of the disclosure to provide a novel nitrogen battery that can be used as an energy device. Other objects of the disclosure are to provide a novel fuel synthesizing apparatus and a novel fuel synthesizing method that use the nitrogen battery.

The present inventors have conducted extensive studies to achieve the above objects and found that the use of a nonaqueous electrolytic solution containing a silane compound while nitrogen gas is present in the positive electrode allows the discharge reaction to proceed easily at a high voltage of about 3 V. This finding has led to the completion of the invention disclosed in the present description.

A nitrogen battery disclosed in the present description includes:

a positive electrode that uses nitrogen as a positive electrode active material;

a negative electrode; and an ion conducting medium that contains a silane compound and conducts alkali metal ions.

A fuel synthesizing apparatus disclosed in the present description is a fuel synthesizing apparatus that uses the nitrogen battery described above, wherein a silylamine obtained after actuation of the nitrogen battery is treated with water to thereby produce ammonia as fuel.

A fuel synthesizing method disclosed in the present description is a fuel synthesizing method that uses the nitrogen battery described above, wherein a silylamine obtained after actuation of the nitrogen battery is treated with water to thereby produce ammonia as fuel.

The present disclosure can provide a novel nitrogen battery that can be used as an energy device. With this nitrogen battery, nitrogen is reduced by reaction with a silane compound to thereby produce a silylamine, and the battery can be discharged. By treating the produced silylamine with water, ammonia can be synthesized as fuel.

DETAILED DESCRIPTION OF THE INVENTION

Figure 1:
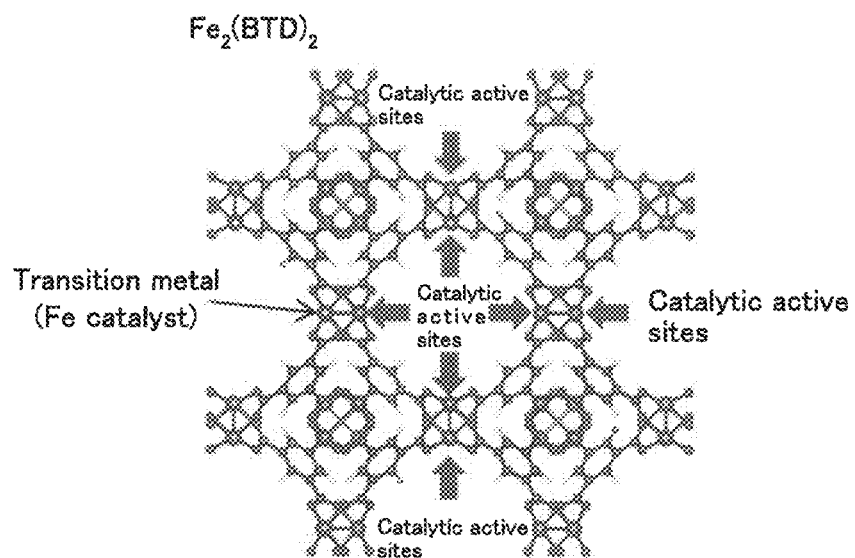
FIG. 1 is an illustration showing the structure of a metal-organic framework of benzenetricarboxylic acid.

The nitrogen battery of the present disclosure includes: a positive electrode (working electrode) that uses nitrogen as a positive electrode active material; a negative electrode (counter electrode); and an ion conducting medium that contains a silane compound and conducts alkali metal ions. Examples of the alkali metal include lithium, sodium, and potassium. The ion conducting medium may conduct ions of any of these alkali metals. A nonaqueous electrolyte lithium nitrogen battery that uses lithium ions as carriers will be mainly described for convenience of description.

In the nitrogen battery of the present disclosure, the negative electrode is an electrode facing the positive electrode. No particular limitation is imposed on the negative electrode so long as it can be used for the nitrogen battery. The negative electrode may contain a negative electrode active material capable of occluding and releasing the alkali metal ions. Preferably, the negative electrode active material is capable of occluding and releasing lithium. Examples of the negative electrode capable of occluding and releasing lithium include metallic lithium, lithium alloys, metal oxides, metal sulfides, and carbonaceous materials capable of occluding and releasing lithium. Examples of the lithium alloys include alloys of lithium with aluminum, tin, magnesium, indium, and calcium. Examples of the metal oxides include tin oxide, silicon oxide, lithium titanium oxide, niobium oxide, and tungsten oxide. Examples of the metal sulfides include tin sulfide and titanium sulfide. Examples of the carbonaceous materials capable of occluding and releasing lithium include graphite, coke, mesophase pitch-based carbon fibers, spherical carbon, and resin-fired carbon.

In the nitrogen battery of the present disclosure, the positive electrode uses gaseous nitrogen as the positive electrode active material. The gas may be air or nitrogen gas. The positive electrode may contain an electrical conducting material. The positive electrode may be formed by press-forming, onto a current collector, an electrode mixture prepared by mixing the electrical conducting material, a binder, etc. Alternatively, the positive electrode may be prepared by mixing the electrical conducting material and a binder with a solvent and applying the mixture to a current collector. No particular limitation is imposed on the electrical conducting material so long as it has electric conductivity. Examples of the electrical conducting material include carbon. The carbon may be: carbon black such as Ketjen black, acetylene black, channel black, furnace black, lamp black, or thermal black; graphite such as natural graphite, e.g., flake graphite, artificial graphite, or expanded graphite; activated carbon prepared using charcoal or coal as a raw material; or carbon fibers prepared by carbonizing synthetic fibers or a petroleum pitch-based raw material. The electrical conducting material may be carbon paper or may be conductive fibers such as metallic fibers, metal powder such as nickel powder or aluminum powder, or an organic conductive material such as a polyphenylene derivative. These may be used alone, or a mixture of a plurality of them may be used. The positive electrode more preferably has interfaces at which the gaseous nitrogen and the ion conducting medium are uniformly distributed and is preferably a porous electrode. Particularly preferably, the positive electrode is a porous carbon electrode containing carbon.

The binder plays a role in binding particles of the electrical conducting material together. Examples of the binder include: fluorine-containing resins such as polytetrafluoroethylene (PTFE), polyvinylidene fluoride (PVdF), and fluorocarbon rubber; thermoplastic resins such as polypropylene, polyethylene, and polyacrylonitrile; ethylene propylene diene monomer (EPDM) rubber; sulfonated EPDM rubber; and natural butyl rubber (NBR). These may be used alone or as a mixture of two or more. The binder used may be, for example, a water dispersion of a water-based binder such as a cellulose-based binder or styrene-butadiene rubber (SBR).

The amount of the binder added is preferably from 3 parts by mass to 15 parts by mass inclusive based on the total mass of the electrode mixture. This may be because the addition of the binder in an amount of 3 parts by mass or more is sufficient to maintain the strength of the positive electrode and because, when the amount of the binder added is 15 parts by mass or less, the amount of an electrode catalyst described later and the amount of the electrical conducting material are not excessively reduced and therefore the progress of the battery reaction is not hindered. Examples of the solvent used to disperse the electrical conducting material and the binder include: organic solvents such as N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran; and alcohols such as ethanol. Alternatively, a dispersant, a thickener, etc. may be added to water, and a latex such as SBR may be used to form a slurry of the mixture. Examples of the thickener include polysaccharides such as carboxymethyl cellulose and methyl cellulose, and these may be used alone or as a mixture of two or more. Examples of the coating method include roller coating using an applicator roller etc., screen coating, a doctor blade method, spin coating, and bar coating, and any of these may be used to obtain a given thickness and a given shape. Alternatively, a kneaded electrode mixture may be compression-bonded to a mesh-shaped current collector.

The current collector is preferably a porous body such as a net- or mesh-shaped body in order to allow nitrogen to diffuse rapidly and may be a porous metal plate made of stainless steel, nickel, or aluminum. The surface of the current collector may be coated with an oxidation resistant metal or alloy coating in order to prevent oxidation. Alternatively, the current collector may be prepared by forming, on glass or a polymer, a single layer of a transparent electrical conducting material such as $InSnO_2$, $SnO_2$, ZnO, or $In_2O_3$ or an impurity-doped material such as fluorine-doped tin oxide ($SnO_2$:F), antimony-doped tin oxide ($SnO_2$:Sb), tin-doped indium oxide ($In_2O_3$:Sn), aluminum-doped zinc oxide (ZnO:Al), or gallium-doped zinc oxide (ZnO:Ga) or a stack of layers of any of these materials. No particular limitation is imposed on the thickness of the single layer or the stack of layers, and the thickness is preferably 3 nm or more and less than 10 µm inclusive. The surface of the glass or the polymer may be flat or may have irregularities.

In the nitrogen battery of the present disclosure, the positive electrode may include an electrode catalyst with transition metal ions immobilized thereon. The transition metal is preferably a metal capable of reducing nitrogen. For example, the transition metal is preferably at least one selected from Sc, Ti, V, Cr, Mn, Fe, Co, Ni, Cu, Zn, Mo, Ru, Be, and Mg, more preferably a divalent transition metal, and still more preferably at least one of Fe, Co, Ni, and Ru. The electrode catalyst is, for example, a metal-organic framework containing a transition metal (at least one of Fe, Co, Ni, and Ru) and an organic compound, and this organic framework may contain at least one selected from structures represented by formulas (1) to (3). For example, this electrode catalyst may be a metal-organic framework represented by $M_2A_3$ (M is at least one of Fe, Co, Ni, and Ru, and A is 1,3,5-benzenetricarboxylic acid (formula 1)) (reference 1: Inorg. Chem., 2007, 46(19), pp. 7782-7788, reference 2: J. Phys. Chem. C 2015, 119, 6556-6567). The electrode catalyst may be a metal-organic framework represented by $M_2B$ (M is at least one of Fe, Co, Ni, and Ru, and B is 2,5-dihydroxyterephthalic acid (formula 3)) (reference 3: J.

Figure 2:
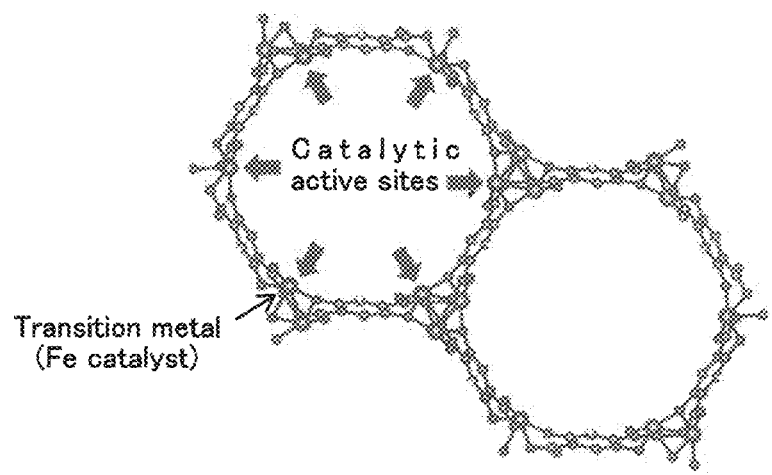
FIG. 2 is an illustration showing the structure of a metal-organic framework of 2,5-dihydroxyterephthalic acid.

Am. Chem. Soc., 2011, 133, 14814-14822). FIG. 1 is an illustration showing the structure of the metal-organic framework of benzenetricarboxylic acid. FIG. 2 is an illustration showing the structure of the metal-organic framework of 2,5-dihydroxyterephthalic acid. In these electrode catalysts, the organic compounds and the transition metals form ordered structures, and the metal-organic frameworks shown in FIGS. 1 and 2 are thereby formed. When any of these structures is formed, the catalyst is less likely to dissolve in a nonaqueous electrolytic solution and functions as a catalyst immobilized on the electrode. The transition metal contained in the metal-organic framework has catalytic active sites (open metal sites), and it can be inferred that a catalytic effect in a scheme for the silane compound described later is obtained by utilizing these catalytic active sites. The positive electrode including the electrode catalyst is preferable because an improvement in discharge voltage and an improvement in discharge capacity can be achieved.

[Chem. 1]

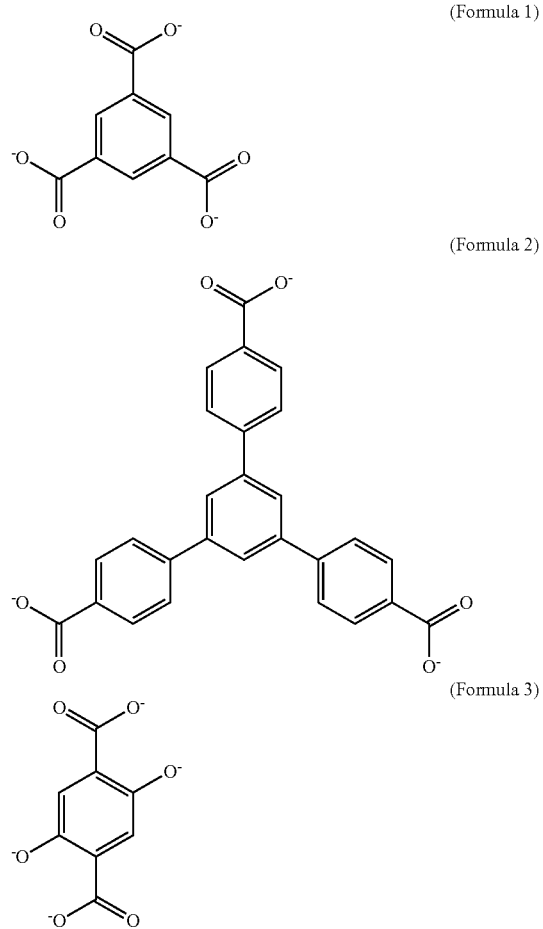

(Formula 1)

(Formula 2)

(Formula 3)

In the nitrogen battery of the present disclosure, the ion conducting medium in contact with the positive electrode or the negative electrode conducts alkali metal ions. For example, a nonaqueous electrolytic solution containing a supporting electrolyte can be used as the ion conducting medium. No particular limitation is imposed on the supporting electrolyte. For example, known supporting electrolytes may be used, such as lithium salts including $LiPF_6$, $LiClO_4$, $LiAsF_6$, $LiEF_4$, $Li(CF_3SO_3)$, $Li(CF_3SO_2)_2N(LiTFSI)$, $Li(SO_2F)_2N(LiFSI)$, and $LiN(C_2F_5SO_2)_2$. These supporting electrolytes may be used alone or in combination of two or more. The concentration of the supporting electrolyte is preferably 0.1 to 3.0 M (mol/L) and more preferably 0.5 to 2.0 M. An organic solvent can be used for the nonaqueous electrolytic solution. Examples of the organic solvent include cyclic carbonates, chain carbonates, cyclic esters, cyclic ethers, and chain ethers. Examples of the cyclic carbonates include ethylene carbonate, propylene carbonate, butylene carbonate, and vinylene carbonate. Examples of the chain carbonates include dimethyl carbonate, diethyl carbonate, and methyl ethyl carbonate. Examples of the cyclic esters include γ-butyrolactone and γ-valerolactone. Examples of the cyclic ethers include tetrahydrofuran and 2-methyltetrahydrofuran. Examples of the chain ethers include dimethoxyethane and ethylene glycol dimethyl ether. These may be used alone or as a mixture of two or more. Other examples of the nonaqueous electrolytic solution include nonaqueous electrolytic solutions containing at least one of: nitrile-based solvents such as acetonitrile, propylnitrile, and 3-methoxypropionitrile; and ionic liquids such as N-methyl-N-propylpiperidinium bis(trifluoromethanesulfonyl)imide, N,N,N-trimethyl-N-propylammonium bis(trifluoromethanesulfonyl)imide, and N,N-dimethyl-N-methyl-N-(2-methoxyethyl)ammonium bis(trifluoromethylsulfonyl)imide. The ion conducting medium may be a gel electrolyte or a solid electrolyte.

In the nitrogen battery of the present disclosure, the ion conducting medium contains the silane compound. In particular, the ion conducting medium includes an ion conducting medium in contact with the positive electrode, and at least this ion conducting medium contains the silane compound. The silane compound may be, for example, a trialkylsilane compound. Each of these alkyl groups is, for example, an alkyl group having 1 to 8 carbon atoms and more preferably 1 to 4 carbon atoms, may be a linear alkyl group, and may have a branched chain. The silane compound may be a halogenated compound and may contain F, Cl, Br, I, etc. Specific examples of the silane compound include chlorotrimethylsilane, chlorotriethylsilane, and chlorotripropylsilane. Preferably, the ion conducting medium contains the silane compound in an amount in the range of 0.5 mol/L or more and less than 7.5 mol/L inclusive. In this range, the silane compound can exerts its function. The silane compound is contained in the ion conducting medium in an amount of more preferably 0.8 mol/L or more and still more preferably 1 mol/L or more. The silane compound is contained in the ion conducting medium in an amount of more preferably 3 mol/L or less and still more preferably 2 mol/L or less.

It can be inferred that, when the ion conducting medium contains the silane compound, a positive electrode reaction and a negative electrode reaction proceed according to the scheme shown below (reference 4: Nature Commun., 3, 1254, 2012). In the following exemplary description, the silane compound used is chlorotrimethylsilane ($Me_3Si$—Cl), and an Fe catalyst (M=Fe) is present. When nitrogen is present in the positive electrode and the silane compound is also present in the positive electrode, reactions represented by formulas 4 and 5 below proceed in the positive electrode and the negative electrode, respectively. In this case, it can be inferred that the reaction of $Me_3Si$—Cl in the positive electrode proceeds in two stages shown in formula 6 (reference 5: J. Am. Chem. Soc., 2011, 133, 3498-3506). When the silane compound is present on the positive electrode side, nitrogen can be used as a positive electrode active material. It can be inferred that the presence of the electrode catalyst allows the discharge reaction to proceed more efficiently according to the following scheme.

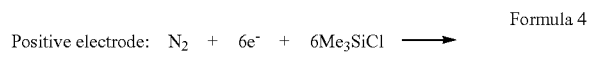

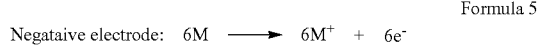

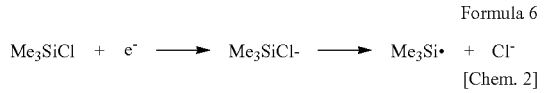

[Chem. 2]

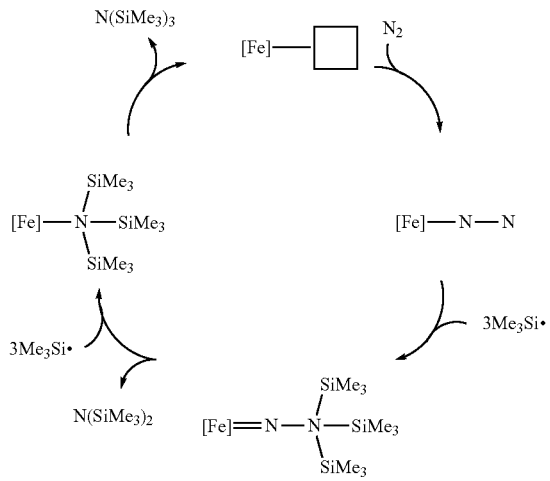

The nitrogen battery of the present disclosure may include a separator disposed between the negative electrode and the positive electrode. No particular limitation is imposed on the separator, so long as it has a composition that can withstand use in the nitrogen battery. Examples of the separator include: polymer nonwoven fabrics such as polypropylene-made nonwoven fabrics and polyphenylene sulfide-made nonwoven fabrics; and olefin-based resin microporous films such as polyethylene and polypropylene microporous films. These may be used alone or in combination.

The nitrogen battery of the present disclosure may include a solid electrolyte disposed between the positive electrode and the negative electrode. In this case, the positive electrode side and the negative electrode side can be separated from each other. In particular, the concentration of the silane compound on the positive electrode side can be increased, and this is preferable from the viewpoint of further improving the discharge characteristics of the nitrogen battery. More specifically, the nitrogen battery may include, between the positive electrode and the negative electrode, a solid electrolyte that conducts alkali metal ions, and the ion conducting medium may include a positive electrode-side ion conducting medium in contact with the positive electrode and a negative electrode-side ion conducting medium in contact with the negative electrode. At least the positive electrode-side ion conducting medium may contain the silane compound. No particular limitation is imposed on the solid electrolyte, so long as it can conduct the alkali metal ions serving as carriers. For example, when the carriers are lithium ions, the solid electrolyte may be glass ceramic LICGC (OHARA INC.). In addition, solid electrolytes disclosed in Japanese Patent Application No. 2009-122991 may be used, such as garnet-type oxide $Li_{5+x}La_3(Zr_x, Nb_{2-x})O_{12}$ (X: $1.4 \leq X < 2$), garnet-type oxide $Li_7La_3Zr_2O_{12}$; garnet-type oxide $Li_7ALa_3Nb_2O_{12}$ (A=Ca, Sr, Ba), and glass ceramic $Li_{1.5}Al_{0.5}Ge_{1.5}(PO_4)_3$ (LAGP). The positive electrode-side ion conducting medium and the negative electrode-side ion conducting medium may have the same composition except for the presence of the silane compound or may have different compositions. In consideration of the process of preparing the ion conducting medium, it is preferable that these ion conducting mediums have the same composition. When the negative electrode is, for example, metallic lithium, the negative electrode may be joined directly to the solid electrolyte, so long as the solid electrolyte is stable to the negative electrode.

Figure 3:
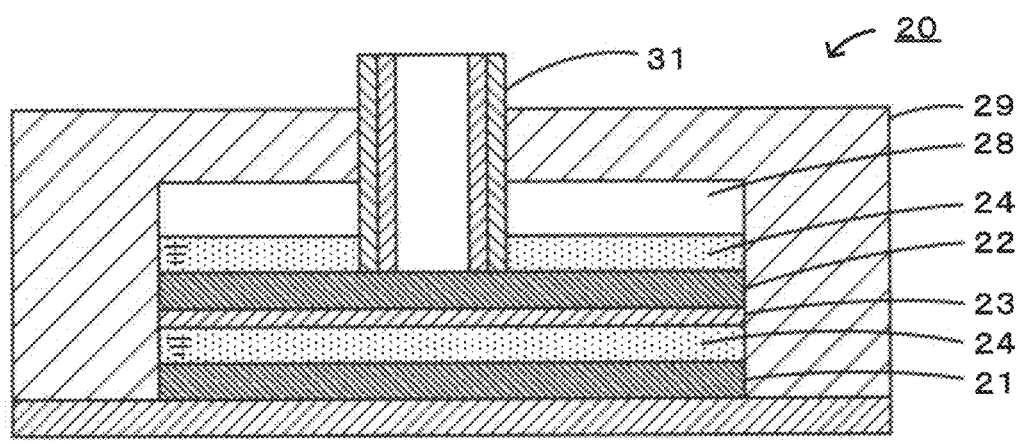
FIG. 3 is a schematic illustration showing an example of a nitrogen battery 20.

No particular limitation is imposed on the shape of the nitrogen battery of the present disclosure, and examples of the shape include a coin shape, a button shape, a sheet shape, a stacked shape, a cylindrical shape, a flattened shape, and a square shape. The nitrogen battery may be applied to a large battery used for electric vehicles etc. FIG. 3 is a schematic illustration showing an example of the nitrogen battery 20 of the present disclosure. The nitrogen battery 20 includes a negative electrode 21, a positive electrode 22 that uses nitrogen as a positive electrode active material, and a separator 23 disposed between the negative electrode 21 and the positive electrode 22. The nitrogen battery 20 further includes an ion conducting medium 24 that conducts lithium ions and is disposed on the positive electrode 22 and between the negative electrode 21 and the positive electrode 22. The ion conducting medium 24 is a nonaqueous electrolytic solution containing a supporting electrolyte and a silane compound and conducts lithium ions. A gas introduction portion 28 that is a space for introducing nitrogen is formed above the positive electrode 22. The nitrogen battery 20 further includes a casing 29 and a pressing member 31. The casing 29 is a container that is made of an insulator and contains the negative electrode 21 and the positive electrode 22. The pressing member 31 is a member that presses the positive electrode 22, and nitrogen can flow inside the pressing member 31. A gas reservoir filled with nitrogen may be connected to the pressing member 31. The nitrogen battery 20 can be discharged by using nitrogen as the positive electrode active material.

Figure 4:
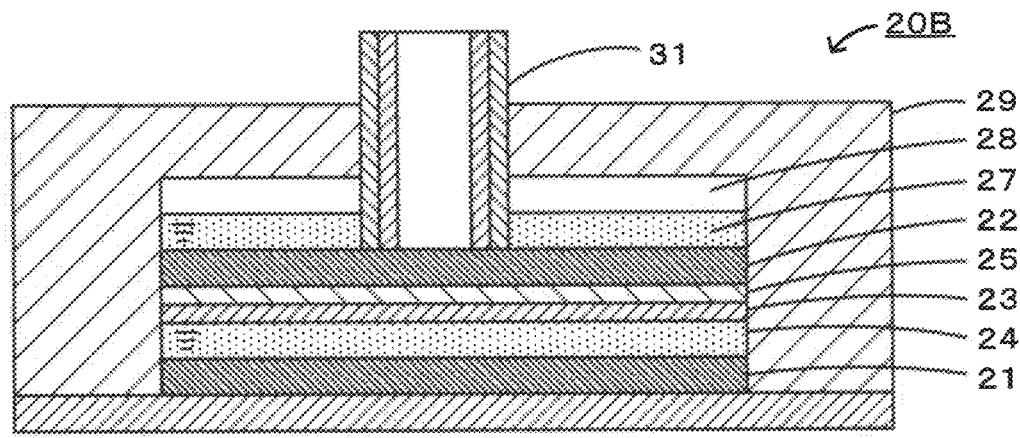
FIG. 4 is a schematic illustration showing an example of a nitrogen battery 20B.

Alternatively, the nitrogen battery has a structure in which the negative electrode 21 and the positive electrode 22 are separated from each other through a solid electrolyte. FIG. 4 is a schematic illustration showing an example of a nitrogen battery 20B. The nitrogen battery 20B includes, in addition to the components in the nitrogen battery 20 described above: a negative electrode-side ion conducting medium 26 that conducts lithium ions and is disposed between the negative electrode 21 and the separator 23; and a solid electrolyte layer 25 that conducts lithium ions and is disposed between the positive electrode 22 and the separator 23. A positive electrode-side ion conducting medium 27 that conducts lithium ions is disposed on the positive electrode 22 (on the side opposite to the solid electrolyte layer 25). The positive electrode-side ion conducting medium 27 is a nonaqueous electrolytic solution in contact with the positive electrode 22 and containing the supporting electrolyte and the silane compound. The positive electrode-side ion conducting medium 27 may be in contact with the solid electrolyte layer 25 through a porous positive electrode 22. The negative electrode-side ion conducting medium 26 is a nonaqueous electrolytic solution containing the supporting electrolyte and no silane compound and conducts lithium ions. In the nitrogen battery 20B, the silane compound can be present in the ion conducting medium on the positive electrode side, and therefore the reaction of nitrogen can be further improved.

The fuel synthesizing apparatus of the present disclosure uses the nitrogen battery described above. The fuel synthesizing method also uses the nitrogen battery described above. In the fuel synthesizing apparatus, a silylamine obtained after actuation of the nitrogen battery is treated with water, and ammonia generated is obtained as fuel. Generally, ammonia is synthesized at high temperature and high pressure. In the present disclosure, ammonia can be obtained while the nitrogen battery is discharged at room temperature and normal pressure. For example, the fuel synthesizing apparatus may include: a container that contains the ion conducting medium taken out of the discharged nitrogen battery and containing the silylamine, i.e., a product formed by discharging; an introduction portion that introduces water into the container; and a discharge portion that discharges water from the container. For example, by adding water to the silylamine, i.e., the product formed by discharging, hydrolysis occurs, and ammonia extracted in water is obtained.

With the nitrogen battery of the present disclosure described above in detail, a novel nitrogen battery that can be used as an energy device can be provided. This nitrogen battery can be discharged while nitrogen is reduced through the reaction of the silane compound to form the silylamine. By reacting the formed silylamine with water, ammonia used as fuel can be synthesized.

The present disclosure is not limited to the above embodiments, and it will be appreciated that the present disclosure can be implemented in various forms so long as they fall within the technical scope of the disclosure.

For example, in the nitrogen battery 20B exemplified in one of the above embodiments, the positive electrode and the negative electrode are separated from each other through the solid electrolyte. However, this is not a limitation, and the solid electrolyte may not be provided. Such a nitrogen battery can have a simplified structure. However, from the viewpoint of disposing the silane compound on the positive electrode side, it is preferable to separate the positive electrode from the negative electrode.

EXAMPLES

Hereinafter, examples in which the nitrogen battery of the present disclosure was actually produced will be described as Experimental Examples. Experimental Examples 1 to 5 and 9 correspond to Examples of the present disclosure, and Experimental Examples 6 to 8 and 10 to 15 correspond to Comparative Examples.

Experimental Example 1

Carbon paper (TGP-H-060 manufactured by TORAY INDUSTRIES Inc.) was cut into a 3.14 cm$^2$ piece. This cut piece was used as the working electrode (positive electrode), and a metallic lithium foil sheet (manufactured by Honjo Metal Co., Ltd.) with a diameter of 10 mm and a thickness of 500 μm was used as the counter electrode (negative electrode). The nitrogen battery (electrochemical evaluation cell) 20B shown in FIG. 4 was produced using these electrodes. First, the negative electrode 21 was placed in the SUS-made casing 29, and the lithium-conductive solid electrolyte layer 25 (manufactured by OHARA) was disposed between the negative electrode 21 and the positive electrode 22. 5 mL of the negative electrode-side ion conducting medium 26 (electrolytic solution A) was injected between the negative electrode 21 and the solid electrolyte layer 25. The electrolytic solution A used was a nonaqueous electrolytic solution containing 1 M lithium bis(trifluoromethanesulfonyl)imide (LiTFSI) serving as a supporting electrolyte and tetraethylene glycol dimethyl ether (TEGDME) serving as a solvent. An electrolytic solution prepared by adding chlorotrimethylsilane (TMSCl) serving as an additive to the electrolytic solution A such that the concentration of TMSCl was 1.0 M was used as the positive electrode-side ion conducting medium 27 (electrolytic solution B). 200 μL of the electrolytic solution B was injected between the solid electrolyte layer 25 and the positive electrode 22. The cell was fixed by pressing the positive electrode 22 by the pressing member 31 through which gas was flowable. The gas introduction portion 28 that was the space into which nitrogen was introducible was formed above the positive electrode 22. A lithium nitrogen battery in Experimental Example 1 in which TMSCl used as the additive was contained in the nonaqueous electrolytic solution on the positive electrode side was obtained in the manner described above. Although not illustrated, the casing 29 is separable into an upper part in contact with the positive electrode 22 and a lower part in contact with the negative electrode 21, and an insulating resin is interposed between the upper and lower parts. The positive electrode 22 and the negative electrode 21 are thereby electrically insulated from each other.

(Discharge Test)

The thus-obtained electrochemical evaluation cell was set in a charge-discharge device (type 5V/100 MA) manufactured by ASKA ELECTRONIC Co., Ltd., and a current of 0.063 mA (20 μA/cm$^2$) was caused to flow between the positive electrode and the negative electrode in a temperature environment of 20° C. to discharge the electrochemical evaluation cell until the discharge potential reached 1.3 V. In Experimental Examples 1 to 6 and 9 to 11, nitrogen was introduced into the gas introduction portion of the positive electrode during discharging. In Experimental Examples 7, 8, and 12 to 15, Ar was introduced into the gas introduction portion during discharging.

Experimental Example 2

In Experimental Example 2, an electrochemical evaluation cell having the same structure as the electrochemical evaluation cell in Experimental Example 1 was used, except for the following differences. Carbon black (Ketjen black manufactured by Lion Corporation) and polytetrafluoroethylene (PTFE) serving as a binder were mixed at a mass ratio of 90:10, and the mixture was formed into a sheet. Then a disk with an area of 2.54 cm$^2$ was punched from the sheet and used as the positive electrode. The area of the negative electrode used was adjusted to be the same as the area of the positive electrode. The discharge test was conducted under the temperature condition of 20° C. while a current of 0.063 mA was caused to flow until the discharge voltage reached 2.0 V.

Experimental Example 3

In Experimental Example 3, an electrochemical evaluation cell having the same structure as the electrochemical evaluation cell in Experimental Example 2 was used, except for the following difference. Iron 1,3,5-benzenetricarboxylate (Fe$_2$(BTD)$_2$: Basolite F300 manufactured by Aldrich) serving as an electrode catalyst, the above-described carbon black, and PTFE were mixed at a mass ratio of 10:81:9, and the mixture was formed into a sheet. Then a disk with an area of 2.54 cm$^2$ was punched from the sheet and used as the positive electrode. In Experimental Example 3, the same discharge test as in Experimental Example 2 was conducted.

Experimental Example 4

In Experimental Example 4, an electrochemical evaluation cell having the same structure as the electrochemical evaluation cell in Experimental Example 3 was used, except that a nonaqueous electrolytic solution prepared by adding LiTFSI serving as the supporting electrolyte such that the concentration of LiTFSI was 0.5 M was used. In Experimental Example 4, the same discharge test as in Experimental Example 3 was conducted.

Experimental Example 5

In Experimental Example 5, an electrochemical evaluation cell having the same structure as the electrochemical evaluation cell in Experimental Example 4 was used, except that a nonaqueous electrolytic solution prepared by adding TMSCl serving as the additive such that the concentration of TMSCl was 2.0 M was used. In Experimental Example 5, the same discharge test as in Experimental Example 3 was conducted.

Experimental Example 6

In Experimental Example 6, an electrochemical evaluation cell having the same structure as the electrochemical evaluation cell in Experimental Example 1 was used, except that a nonaqueous electrolytic solution prepared by adding no TMSCl serving as the additive was used as the nonaqueous electrolytic solution on the positive electrode side. In Experimental Example 6, the same discharge test as in Experimental Example 1 was conducted.

Experimental Examples 7 and 8

In Experimental Example 7, an electrochemical evaluation cell having the same structure as the electrochemical evaluation cell in Experimental Example 6 was used, except that Ar was used as the gas introduced into the positive electrode side. In Experimental Example 8, an electrochemical evaluation cell having the same structure as the electrochemical evaluation cell in Experimental Example 1 was used, except that Ar was used as the gas introduced into the positive electrode side. In Experimental Examples 7 and 8, the same discharge test as in Experimental Example 1 was conducted.

Experimental Example 9

In Experimental Example 9, an electrochemical evaluation cell having the same structure as the electrochemical evaluation cell in Experimental Example 1 was used, except that dicyclopentadienyl iron (ferrocene manufactured by TOKYO CHEMICAL INDUSTRY Co., Ltd.) serving as the catalyst was added to the nonaqueous electrolytic solution on the positive electrode side such that the concentration of the catalyst was 0.02 M.

Experimental Examples 10 to 15

In Experimental Example 10, an electrochemical evaluation cell having the same structure as the electrochemical evaluation cell in Experimental Example 2 was used, except that a nonaqueous electrolytic solution containing no TMSCl was used on the positive electrode side. In Experimental Example 11, an electrochemical evaluation cell having the same structure as the electrochemical evaluation cell in Experimental Example 3 was used, except that a nonaqueous electrolytic solution containing no TMSCl was used on the positive electrode side. In Experimental Example 12, an electrochemical evaluation cell having the same structure as the electrochemical evaluation cell in Experimental Example 2 was used, except that Ar was used as the gas introduced into the positive electrode side. In Experimental Example 13, an electrochemical evaluation cell having the same structure as the electrochemical evaluation cell in Experimental Example 3 was used, except that Ar was used as the gas introduced into the positive electrode side. In Experimental Example 14, an electrochemical evaluation cell having the same structure as the electrochemical evaluation cell in Experimental Example 4 was used, except that Ar was used as the gas introduced into the positive electrode side. In Experimental Example 15, an electrochemical evaluation cell having the same structure as the electrochemical evaluation cell in Experimental Example 5 was used, except that Ar was used as the gas introduced into the positive electrode side.

(Results and Discussion)

Figure 5:
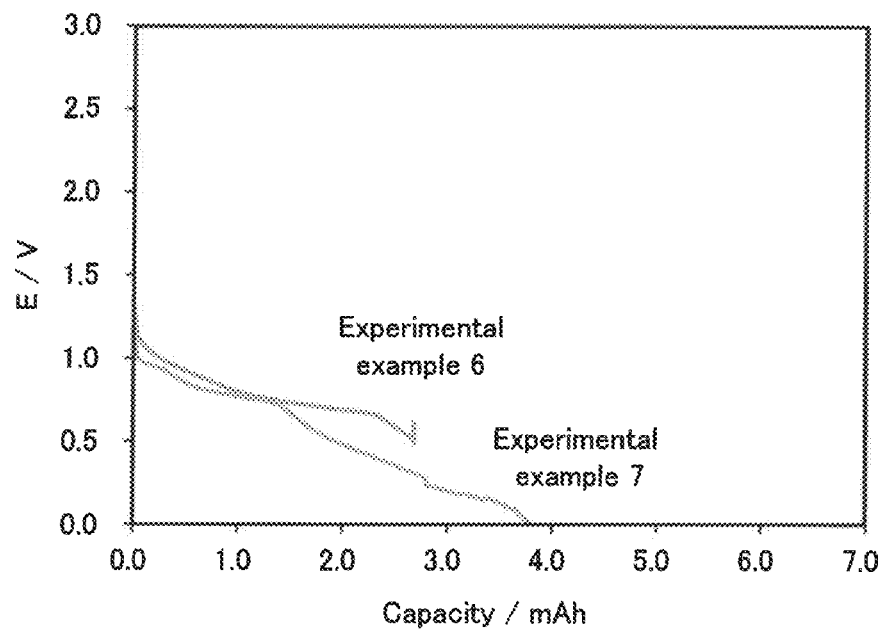
FIG. 5 is a graph showing changes in voltage and battery capacity during discharging in Experimental Examples 6 and 7.
Figure 6:
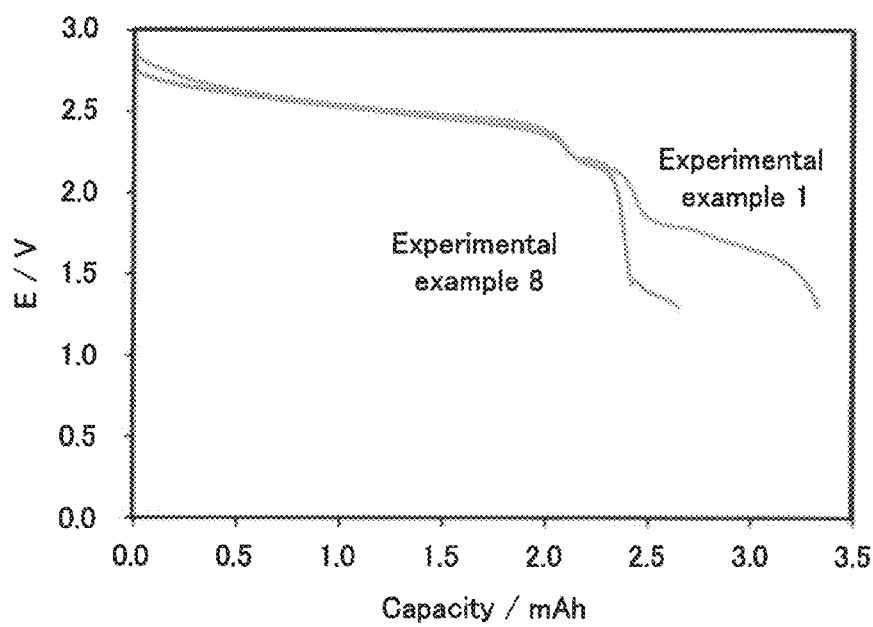
FIG. 6 is a graph showing changes in voltage and battery capacity during discharging in Experimental Examples 1 and 8.

FIGS. 5 to 13 are graphs showing changes in voltage and battery capacity during discharging in Experimental Examples 1 to 15. Table 1 summarizes the structures of the working electrodes (positive electrodes) in Experimental Examples 1 to 15, the gas component introduced into each cell, the additive added to the nonaqueous electrolytic solution on the positive electrode side, the metal catalyst, the concentration of the electrolyte, and the discharge capacity at discharge finish potential. As shown in FIG. 5, in Experimental Examples 6 and 7 in which only the Li nonaqueous electrolytic solution was used, the voltage at the start of discharging was 1 V, and the results obtained were the same as those shown in NPL 1. As can be seen from FIG. 6, in Experimental Example 1 in which the silane compound was added to the nonaqueous electrolytic solution on the positive electrode side, the battery could be discharged at a high discharge voltage exceeding 1.5 V. Since the discharge capacity in Experimental Example 1 was higher than that in Experimental Example 8 in which Ar was used as the gas introduced, it can be inferred that the formation of a radical (Me$_3$Si.) by a discharge reaction (reduction reaction) of chlorotrimethylsilane (TMSCl) and the subsequent discharge reaction of nitrogen represented by the following formulas proceeded.

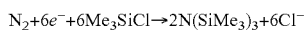

Figure 7:
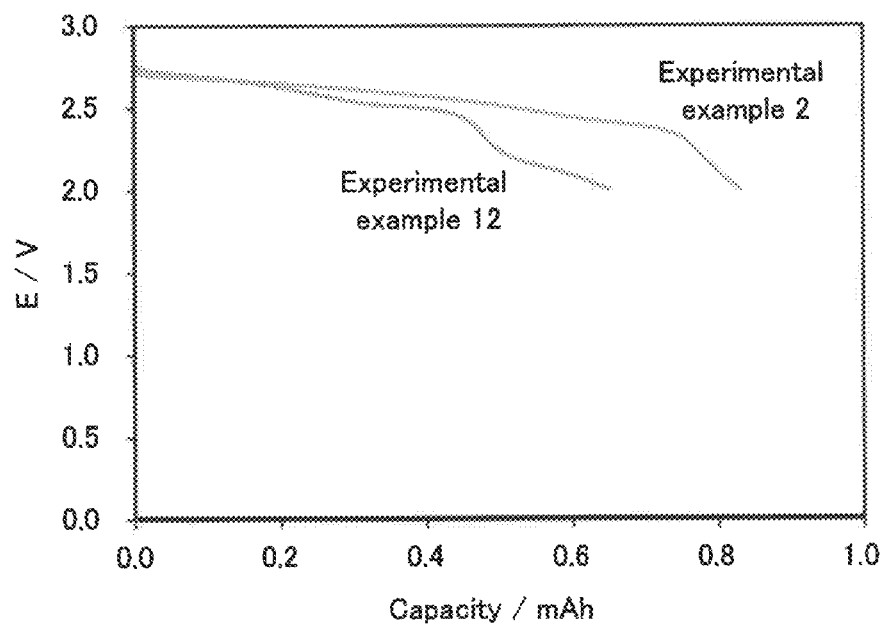
FIG. 7 is a graph showing changes in voltage and battery capacity during discharging in Experimental Examples 2 and 12.
Figure 8:
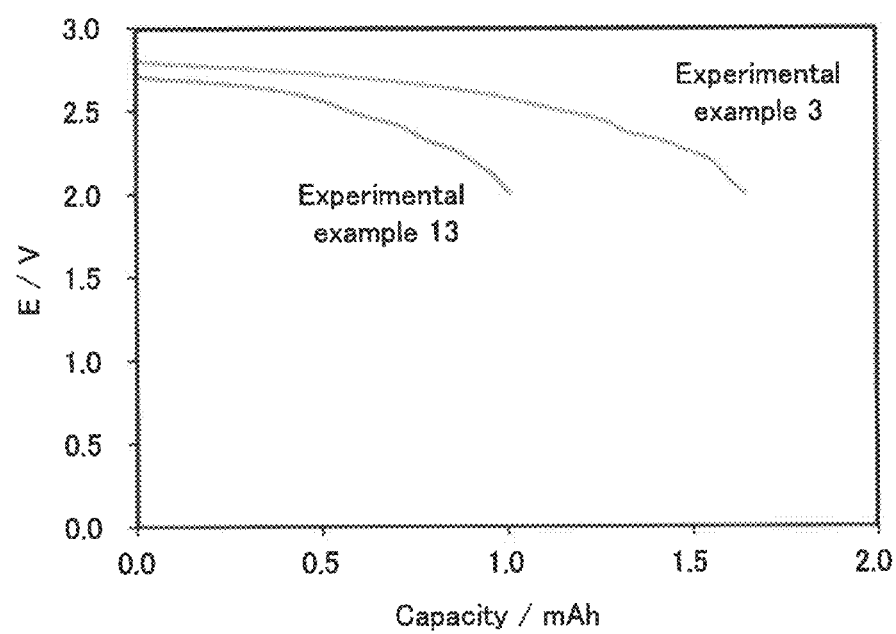
FIG. 8 is a graph showing changes in voltage and battery capacity during discharging in Experimental Examples 3 and 13.
Figure 9:
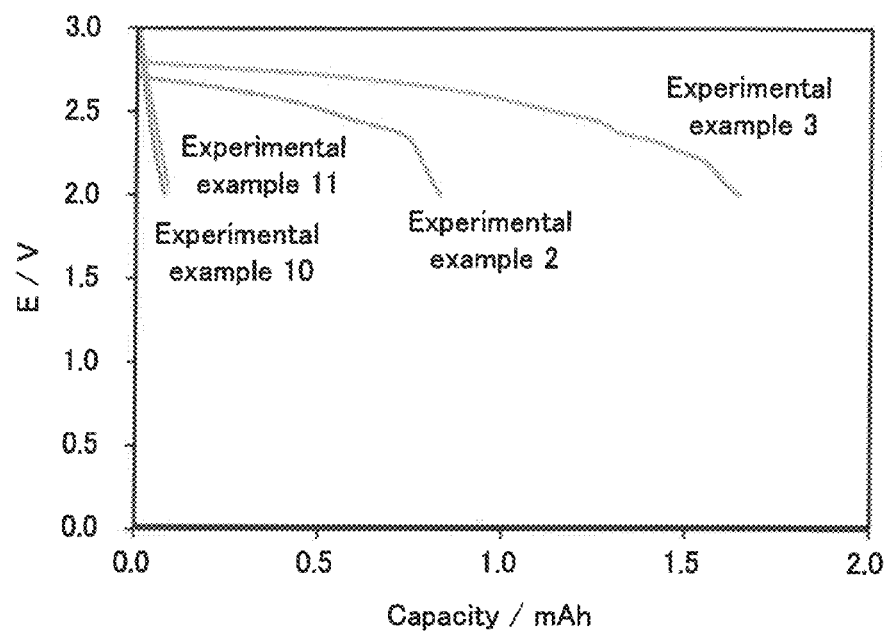
FIG. 9 is a graph showing changes in voltage and battery capacity during discharging in Experimental Examples 2, 3, 10, and 11.

As shown in FIG. 7, in Experimental Example 2 in which the working electrode used was a porous carbon electrode, the discharge capacity at about 2.5 V was higher than that in Experimental Example 12 in which Ar was introduced. In Experimental Example 3, a metal-organic framework (Fe$_2$(BTD)$_2$) synthesized from 1,3,5-benzenetricarboxylic acid (BTD) and divalent iron ions was used as the electrode catalyst mixed into the porous carbon electrode, and the cell was discharged in a nitrogen atmosphere. As shown in FIG. 8, in Experimental Example 3, a significant increase in discharge voltage and a significant improvement in discharge capacity with respect to those in an Ar atmosphere (Experimental Example 13) were found. As shown in FIG.

Figure 10:
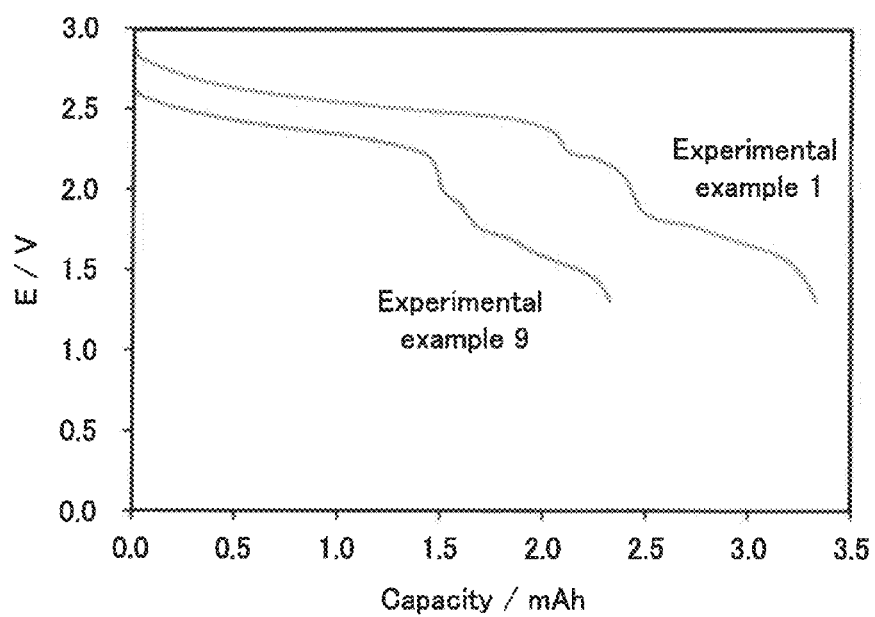
FIG. 10 is a graph showing changes in voltage and battery capacity during discharging in Experimental Examples 1 and 9.

9, in Experimental Example 10 in which the porous carbon electrode contained no electrode catalyst and the nonaqueous electrolytic solution on the positive electrode side contained no silane compound, the discharge capacity was very low. Also in Experimental Example 11 in which the electrode catalyst was contained and no silane compound was contained, the discharge capacity was very low. As can be seen from these results, the discharge capacity at 2.5 V depends on the presence of the silane compound (TMSCl). As shown in FIG. 10, in Experimental Example 9 in which ferrocene serving as the catalyst was added to the nonaqueous electrolytic solution on the positive electrode side, the improvement in discharge capacity was lower than that in Experimental Example 1. Specifically, the use of the structure in reference 4 (Nature Commun., 3, 1254, 2012) that uses ferrocene without modification is not sufficient for the structure of a nitrogen battery. As can be seen from these results, even when a catalyst containing a transition metal such as iron ions is present in a solution, the catalyst does not function properly. However, a catalyst immobilized on an electrode as a metal-organic framework can improve the discharge performance.

Figure 11:
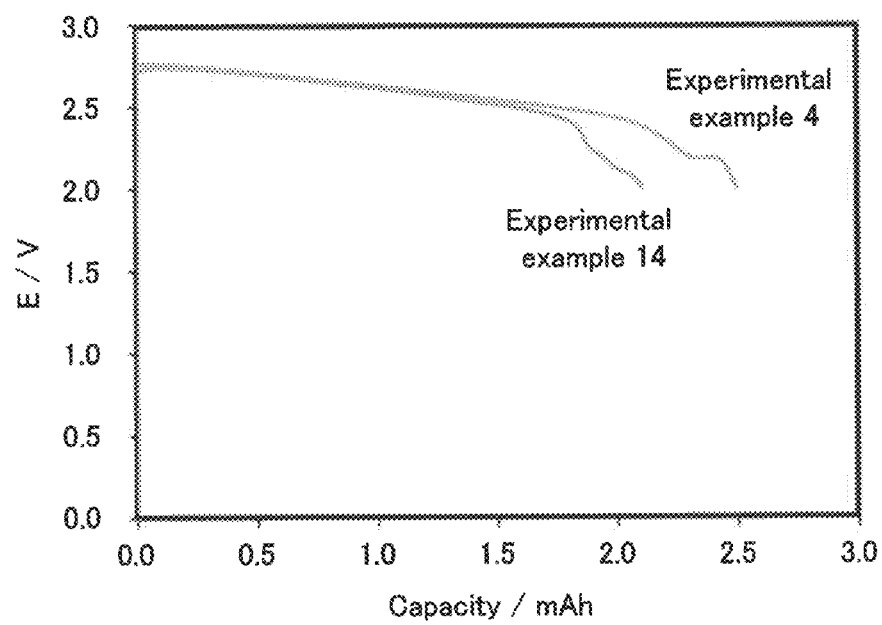
FIG. 11 is a graph showing changes in voltage and battery capacity during discharging in Experimental Examples 4 and 14.
Figure 12:
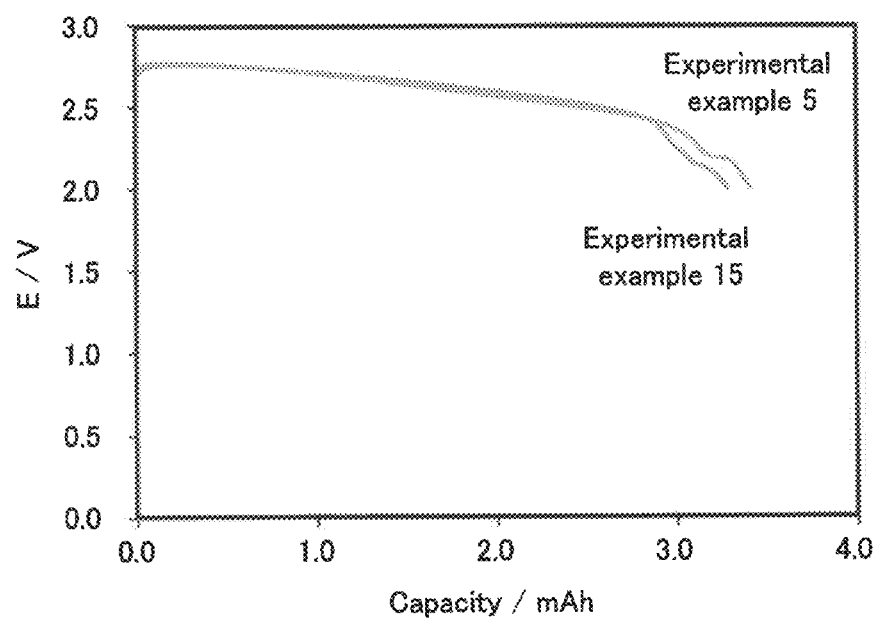
FIG. 12 is a graph showing changes in voltage and battery capacity during discharging in Experimental Examples 5 and 15.
Figure 13:
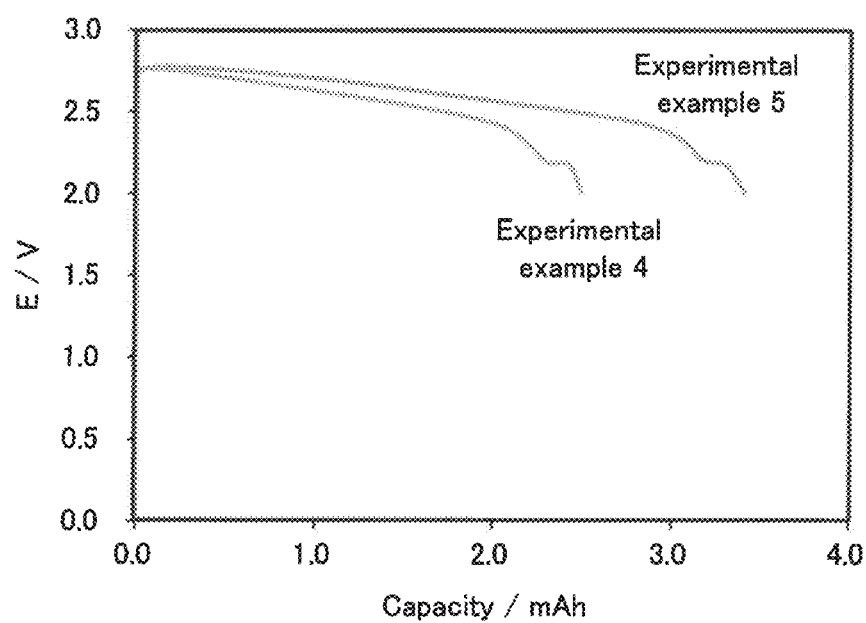
FIG. 13 is a graph showing changes in voltage and battery capacity during discharging in Experimental Examples 4 and 5.

As shown in FIG. 11, also in Experimental Example 4 in which the concentration of the lithium salt serving as the supporting electrolyte was reduced and the cell was discharged in a nitrogen atmosphere, the discharge capacity was higher than that in Experimental Example 14 in which the cell was discharged in an Ar atmosphere, and it can be inferred that nitrogen served as a positive electrode active material. As shown in FIG. 12, also in Experimental Example 5 in which the concentration of TMSCl was increased and the cell was discharged in a nitrogen atmosphere, the discharge capacity was higher than that in Experimental Example 15 in which the cell was discharged in an Ar atmosphere, and it can be inferred that nitrogen served as a positive electrode active material. As shown in FIG. 13, in Experimental Example 5 in which the concentration of TMSCl was increased, the discharge capacity was higher than that in Experimental Example 4, and it became evident that TMSCl is involved in the discharging represented by the above reaction formulas.

As can be seen from the results in the Experimental Examples described above, when the nonaqueous electrolytic solution contains a silane compound (particularly a trialkyl silane compound), a nitrogen battery that uses nitrogen as an active material can be formed. As can be seen, it is preferable that the positive electrode includes an electrode catalyst with ions of a transition metal (e.g., at least one of Fe, Co, Ni, and Ru) immobilized thereon, particularly a metal-organic framework, because higher discharge capacity is obtained. More preferably, the positive electrode is a porous electrode having interfaces at which gaseous nitrogen and the nonaqueous electrolytic solution are uniformly distributed. It has been suggested that the nonaqueous electrolytic solution contain the silane compound in an amount of 0.5 mol/L or more and less than 7.5 mol/L inclusive and further contain a lithium salt (such as LiTFSI) serving as an supporting electrolyte in an amount of 0.5 mol/L or more and less than 2 mol/L inclusive. It can be inferred that ammonia can be extracted by treating a silylamine, which is a product formed by discharging, with water. Ammonia contains hydrogen and can therefore be used as a hydrogen source (fuel). It can be inferred that, by discharging this nitrogen battery at room temperature and normal pressure, ammonia can be synthesized under mild conditions and the nitrogen battery can function as an ammonia synthesizing apparatus.

TABLE 1

| Sample[1] | Electrode | Gas component | Additive | Metal catalyst | LiTFSI/ TEGDME Concentration of the electrolyte (M) | Final discharge capacity[2] (mAh) |
|---|---|---|---|---|---|---|
| Experimental example 1 | Carbon paper | Nitrogen | 1M-TMSCl | None | 1.0 | 3.4 (1.3 V) |
| Experimental example 2 | Carbon black mixture | Nitrogen | 1M-TMSCl | None | 1.0 | 0.8 (2.0 V) |
| Experimental example 3 | Carbon black mixture | Nitrogen | 1M-TMSCl | $Fe_2(BTD)_2$ | 1.0 | 1.6 (2.0 V) |
| Experimental example 4 | Carbon black mixture | Nitrogen | 1M-TMSCl | $Fe_2(BTD)_2$ | 0.5 | 2.5 (2.0 V) |
| Experimental example 5 | Carbon black mixture | Nitrogen | 2M-TMSCl | $Fe_2(BTD)_2$ | 0.5 | 3.2 (2.0 V) |
| Experimental example 6 | Carbon paper | Nitrogen | None | None | 1.0 | 3.8 (0 V) |
| Experimental example 7 | Carbon paper | Ar | None | None | 1.0 | 2.8 (0.5 V) |
| Experimental example 8 | Carbon paper | Ar | 1M-TMSCl | None | 1.0 | 2.6 (1.3 V) |
| Experimental example 9 | Carbon paper | Nitrogen | 1M-TMSCl | Ferrocene | 1.0 | 2.2 (1.3 V) |
| Experimental example 10 | Carbon black mixture | Nitrogen | None | None | 1.0 | 0.1 (2.0 V) |
| Experimental example 11 | Carbon black mixture | Nitrogen | None | $Fe_2(BTD)_2$ | 1.0 | 0.1 (2.0 V) |
| Experimental example 12 | Carbon black mixture | Ar | 1M-TMSCl | None | 1.0 | 0.6 (2.0 V) |
| Experimental example 13 | Carbon black mixture | Ar | 1M-TMSCl | $Fe_2(BTD)_2$ | 1.0 | 0.6 (2.0 V) |

TABLE 1-continued

| Sample[1] | Electrode | Gas component | Additive | Metal catalyst | LiTFSI/ TEGDME Concentration of the electrolyte (M) | Final discharge capacity[2] (mAh) |
|---|---|---|---|---|---|---|
| Experimental example 14 | Carbon black mixture | Ar | 1M-TMSCl | $Fe_2(BTD)_2$ | 0.5 | 2.0 (2.0 V) |
| Experimental example 15 | Carbon black mixture | Ar | 2M-TMSCl | $Fe_2(BTD)_2$ | 0.5 | 3.0 (2.0 V) |

[1]TMSCl: Chlorotrimethylsilane, TFSI: Bis(trifluoromethanesulfonyl)imide, TEGDME: Tetraethylene glycol dimethyl ether, $Fe_2(BTD)_2$: Iron 1,3,5-benzenetricarboxylate
[2]Discharge finish potential is described in the ( ).

The present application claims priority on the basis of the Japanese Patent Application No. 2018-029276 filed on Feb. 22, 2018, the entire contents of which are incorporated herein by reference.

The present disclosure is not limited to the foregoing examples. It will be obvious that various modifications may be made within the technical scope of the present disclosure.

What is claimed is:

1. A nitrogen battery comprising:
   a positive electrode that uses nitrogen as a positive electrode active material;
   a negative electrode; and
   an ion conducting medium that contains a silane compound and conducts alkali metal ions.

2. The nitrogen battery according to claim 1, wherein the ion conducting medium contains a trialkyl silane compound as the silane compound.

3. The nitrogen battery according to claim 1, wherein the ion conducting medium is a nonaqueous electrolytic solution containing the silane compound in an amount in the range of 0.5 mol/L or more and less than 7.5 mol/L inclusive.

4. The nitrogen battery according to claim 1, wherein the positive electrode includes an electrode catalyst with ions of a transition metal immobilized thereon.

5. The nitrogen battery according to claim 4, wherein the electrode catalyst is a metal-organic framework containing the transition metal and an organic compound, and the metal-organic framework includes at least one of structures represented by formulas (1) to (3).

[Chem. 1]

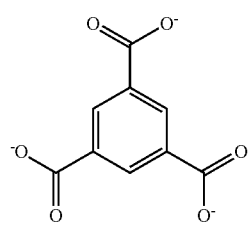

(Formula 1)

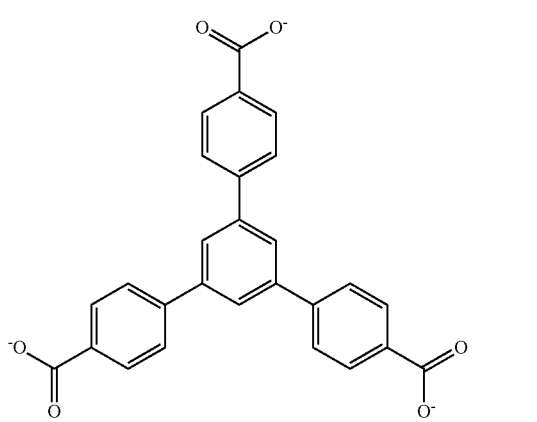

(Formula 2)

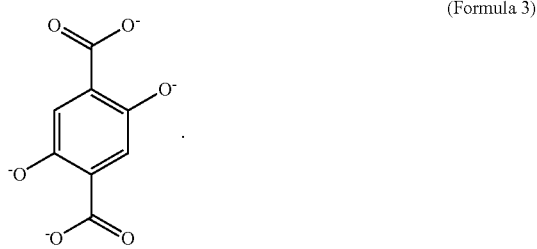

(Formula 3)

6. The nitrogen battery according to claim 1, wherein the positive electrode is a porous electrode having an interface at which gaseous nitrogen and the ion conducting medium are uniformly distributed.

7. The nitrogen battery according to claim 1, wherein the positive electrode is a porous carbon electrode, and
   wherein the silane compound is chlorotrimethylsilane.

8. The nitrogen battery according to claim 1, further comprising a solid electrolyte that is interposed between the positive electrode and the negative electrode and conducts the alkali metal ions,
   wherein the ion conducting medium comprises a positive electrode-side ion conducting medium in contact with the positive electrode and a negative electrode-side ion conducting medium in contact with the negative electrode, and
   wherein at least the positive electrode-side ion conducting medium contains the silane compound.

9. The nitrogen battery according to claim 1, wherein the negative electrode includes a negative electrode active material that occludes and releases lithium, and
   wherein the ion conducting medium conducts lithium ions.

10. A fuel synthesizing apparatus comprising the nitrogen battery according to claim 1,
   wherein a silylamine obtained after actuation of the nitrogen battery is treated with water to thereby produce ammonia as fuel.

11. A fuel synthesizing method that uses the nitrogen battery according to claim 1,
   wherein a silylamine obtained after actuation of the nitrogen battery is treated with water to thereby produce ammonia as fuel.

* * * * *